US012256119B2

United States Patent
Allen et al.

(10) Patent No.: US 12,256,119 B2
(45) Date of Patent: Mar. 18, 2025

(54) SERVER-SIDE DIGITAL CONTENT INSERTION IN AUDIOVISUAL STREAMS BROADCASTED THROUGH AN INTERACTIVE LIVE STREAMING NETWORK

(71) Applicant: Infrared5, Inc., Jamaica Plain, MA (US)

(72) Inventors: Chris Allen, Jamaica Plain, MA (US); Davide Lucchi, Boston, MA (US)

(73) Assignee: Infrared5, Inc., Jamaica Plain, MA (US)

( * ) Notice: Subject to any disclaimer, the term of this patent is extended or adjusted under 35 U.S.C. 154(b) by 0 days.

(21) Appl. No.: 17/713,401

(22) Filed: Apr. 5, 2022

(65) Prior Publication Data

US 2022/0321945 A1    Oct. 6, 2022

Related U.S. Application Data

(60) Provisional application No. 63/171,186, filed on Apr. 6, 2021.

(51) Int. Cl.
*H04N 7/10*         (2006.01)
*H04N 21/2187*  (2011.01)
(Continued)

(52) U.S. Cl.
CPC ..... *H04N 21/4316* (2013.01); *H04N 21/2187* (2013.01); *H04N 21/23424* (2013.01); *H04N 21/234345* (2013.01)

(58) Field of Classification Search
CPC .......... H04N 21/4316; H04N 21/2187; H04N 21/23424; H04N 21/234345; H04N 21/25841
See application file for complete search history.

(56) References Cited

U.S. PATENT DOCUMENTS 8,019,867 B1   9/2011  Allen et al.
8,019,878 B1   9/2011  Allen et al.
(Continued)

FOREIGN PATENT DOCUMENTS

AU    2018257929 B2    7/2022
AU    2022252735 A1    11/2022
(Continued)

OTHER PUBLICATIONS

"3 Pitfalls to Server-Side Ad Insertion Architecture", Red5 Pro, red5pro.com, Mar. 29, 2021, retrieved on [Jun. 3, 2022]. Retrieved from the internet <URL: https://www.red5pro.com/blog/3-pitfalls-to-server-side-ad-Insertion-architecture/> entire document, 4 pages.
(Continued)

*Primary Examiner* — Annan Q Shang
(74) *Attorney, Agent, or Firm* — Outside General Counsel LLP; Peter Gordon

(57) ABSTRACT

Server-side insertion of digital content can be performed on a live streaming network. In one aspect, a server-side system and method for real-time digital content insertion can retrieve and insert custom digital content for each viewer or set of viewers based on criteria like viewer's location and or personal data. In one aspect, a server-side system and method allows for quick and seamless establishment of second screen experiences using invisible data embedded in the video streams with the ability to insert different digital content for each viewer. In one aspect, a system and method detects static areas in a video stream suitable for digital content insertion.

20 Claims, 5 Drawing Sheets

(51) Int. Cl.
*H04N 21/234* (2011.01)
*H04N 21/2343* (2011.01)
*H04N 21/431* (2011.01)

(56) References Cited

U.S. PATENT DOCUMENTS

| | | | |
|---|---|---|---|
| 8,024,469 | B1 | 9/2011 | Allen et al. |
| 8,166,181 | B2 | 4/2012 | Allen et al. |
| 8,171,145 | B2 | 5/2012 | Allen et al. |
| 8,695,048 | B1 | 4/2014 | Kellicker |
| 8,732,775 | B2 | 5/2014 | Kellicker |
| 8,752,113 | B1 | 6/2014 | Good et al. |
| 8,776,101 | B2 * | 7/2014 | Donoghue ....... H04N 21/25883 725/34 |
| 8,782,721 | B1 | 7/2014 | Kellicker |
| 8,782,722 | B1 | 7/2014 | Kellicker |
| 9,043,845 | B2 * | 5/2015 | Davis ................ H04M 1/72412 725/62 |
| 9,100,461 | B2 | 8/2015 | Lemmons et al. |
| 9,124,910 | B2 | 9/2015 | Kellicker |
| 9,226,048 | B2 | 12/2015 | Messmer et al. |
| 9,319,626 | B2 | 4/2016 | Kellicker |
| 9,350,780 | B2 | 5/2016 | Good et al. |
| 9,686,593 | B2 | 6/2017 | Kellicker |
| 9,769,612 | B1 | 9/2017 | Owen |
| 9,774,914 | B2 | 9/2017 | Riegel et al. |
| 10,236,031 | B1 | 3/2019 | Gurijala |
| 10,278,018 | B2 | 4/2019 | Owen |
| 10,298,387 | B1 | 5/2019 | Good |
| 10,306,293 | B2 | 5/2019 | Talvensaari et al. |
| 10,313,758 | B2 | 6/2019 | Riegel et al. |
| 10,601,914 | B2 | 3/2020 | Birrer et al. |
| 10,602,310 | B2 | 3/2020 | Owen |
| 10,855,763 | B2 | 12/2020 | Birrer et al. |
| 10,944,999 | B2 | 3/2021 | Nicol et al. |
| 10,986,421 | B2 | 4/2021 | Master et al. |
| 11,032,348 | B2 | 6/2021 | Kellicker et al. |
| 11,051,049 | B2 | 6/2021 | Bustamante et al. |
| 11,363,314 | B2 | 6/2022 | Nicol et al. |
| 11,470,361 | B2 | 10/2022 | Bustamante et al. |
| 11,490,132 | B2 | 11/2022 | Bustamante et al. |
| 11,612,813 | B2 | 3/2023 | Hooks et al. |
| 2011/0283328 | A1 * | 11/2011 | Davis ................. H04N 21/4334 725/62 |
| 2012/0166289 | A1 | 6/2012 | Gadoury et al. |
| 2012/0222056 | A1 * | 8/2012 | Donoghue ....... H04N 21/47214 725/5 |
| 2012/0308071 | A1 | 12/2012 | Ramsdell et al. |
| 2012/0315011 | A1 | 12/2012 | Messmer et al. |
| 2013/0151856 | A1 | 6/2013 | Petrovic et al. |
| 2013/0305281 | A1 * | 11/2013 | Cansler ............. H04N 21/2407 725/34 |
| 2014/0109157 | A1 | 4/2014 | Kellicker |
| 2014/0109158 | A1 | 4/2014 | Kellicker |
| 2014/0208373 | A1 | 7/2014 | Kellicker |
| 2014/0281007 | A1 | 9/2014 | Lemmons et al. |
| 2014/0281014 | A1 | 9/2014 | Good et al. |
| 2014/0300813 | A1 | 10/2014 | Kellicker |
| 2015/0026743 | A1 | 1/2015 | Kim et al. |
| 2016/0105428 | A1 | 4/2016 | Schrempp et al. |
| 2016/0150297 | A1 * | 5/2016 | Petrovic .......... H04N 21/23892 725/25 |
| 2016/0192023 | A1 | 6/2016 | Kellicker |
| 2017/0064400 | A1 | 3/2017 | Riegel et al. |
| 2017/0076522 | A1 | 3/2017 | Ives-Halperin et al. |
| 2017/0171611 | A1 | 6/2017 | Nair et al. |
| 2017/0366856 | A1 | 12/2017 | Riegel et al. |
| 2018/0054707 | A1 | 2/2018 | Owen |
| 2018/0131900 | A1 | 5/2018 | Talbot |
| 2018/0288369 | A1 | 10/2018 | Gaebel et al. |
| 2018/0309827 | A1 | 10/2018 | Birrer et al. |
| 2019/0007754 | A1 | 1/2019 | Master et al. |
| 2019/0028465 | A1 | 1/2019 | Allen et al. |
| 2019/0028758 | A1 | 1/2019 | Talvensaari et al. |
| 2019/0182554 | A1 | 6/2019 | Schupak |
| 2019/0215540 | A1 | 7/2019 | Nicol et al. |
| 2019/0246146 | A1 | 8/2019 | Bustamante et al. |
| 2019/0253839 | A1 | 8/2019 | Owen |
| 2019/0313161 | A1 | 10/2019 | Wilms |
| 2019/0320004 | A1 | 10/2019 | Allen et al. |
| 2019/0320014 | A1 | 10/2019 | Allen et al. |
| 2019/0356966 | A1 | 11/2019 | Zuydervelt et al. |
| 2020/0059396 | A1 | 2/2020 | Stern et al. |
| 2020/0059693 | A1 | 2/2020 | Neumeier et al. |
| 2020/0186601 | A1 | 6/2020 | Birrer et al. |
| 2020/0221112 | A1 | 7/2020 | Braudaway et al. |
| 2020/0322412 | A1 | 10/2020 | Kellicker et al. |
| 2020/0372546 | A1 | 11/2020 | Maher et al. |
| 2021/0084389 | A1 | 3/2021 | Young |
| 2021/0093967 | A1 | 4/2021 | Hooks et al. |
| 2021/0204003 | A1 | 7/2021 | Nicol et al. |
| 2021/0289236 | A1 | 9/2021 | Bustamante et al. |
| 2021/0311910 | A1 | 10/2021 | Calveley |
| 2021/0352337 | A1 | 11/2021 | Bustamante et al. |
| 2021/0400142 | A1 * | 12/2021 | Jorasch ............... H04L 65/1069 |
| 2022/0007083 | A1 | 1/2022 | Lin |
| 2022/0078514 | A1 | 3/2022 | Bustamante et al. |
| 2022/0201372 | A1 | 6/2022 | Lucchi et al. |
| 2022/0303593 | A1 | 9/2022 | Nicol et al. |
| 2023/0070531 | A1 | 3/2023 | Bustamante et al. |
| 2023/0156246 | A1 | 5/2023 | Bustamante et al. |
| 2023/0319334 | A1 * | 10/2023 | Donoghue ....... H04N 21/25891 725/34 |

FOREIGN PATENT DOCUMENTS

| | | | |
|---|---|---|---|
| CA | 3089963 | A1 | 8/2019 |
| CA | 3059564 | C | 12/2020 |
| EP | 2540072 | B1 | 4/2014 |
| EP | 3488439 | B1 | 8/2021 |
| EP | 3750301 | B1 | 6/2023 |
| EP | 4209002 | A1 | 7/2023 |
| EP | 3923269 | B1 | 11/2023 |
| WO | 2011/103075 | A1 | 8/2011 |
| WO | 2018/017878 | A1 | 1/2018 |
| WO | 2018/200184 | A1 | 11/2018 |
| WO | 2019/157082 | A1 | 8/2019 |
| WO | 2020/036796 | A1 | 2/2020 |
| WO | 2022/051612 | A1 | 3/2022 |
| WO | 2022/140111 | A1 | 6/2022 |
| WO | 2022/216663 | A1 | 10/2022 |

OTHER PUBLICATIONS

PCT, "International Preliminary Report on Patentability", International Application No. PCT/US2021/063282, Jul. 6, 2023, 7 Pages.
PCT, "International Search Report and Written Opinion Received", International Application No. PCT/US2022/023418, Jun. 24, 2022, 29 Pages.
USPTO, "International Search Report and Written Opinion", International Application No. PCT/US2021/063282, May 4, 2022, 15 Pages.
PCT, "International Preliminary Report on Patentability", International Application No. PCT/US2022/023418, Oct. 19, 2023, 12 Pages.
U.S. Patent and Trademark Office, "Non-Final Office Action Received", U.S. Appl. No. 17/550,472, Dec. 20, 2023.
U.S. Patent and Trademark Office, U.S. Appl. No. 17/550,472, Final Office Action, mailed Sep. 16, 2024.
U.S. Patent and Trademark Office , "Notice of Allowance Received", U.S. Appl. No. 17/550,472, Dec. 5, 2024, 11 Pages.

* cited by examiner

SERVER-SIDE DIGITAL CONTENT INSERTION IN AUDIOVISUAL STREAMS BROADCASTED THROUGH AN INTERACTIVE LIVE STREAMING NETWORK

CROSS-REFERENCE TO RELATED APPLICATIONS

This application is a nonprovisional patent application of, and claims the benefit under 35 USC § 119 to, prior filed U.S. provisional patent application Ser. No. 63/171,186, entitled "SERVER-SIDE DIGITAL CONTENT INSERTION IN AUDIOVISUAL STREAMS BROADCASTED THROUGH AN INTERACTIVE LIVE STREAMING NETWORK", filed Apr. 6, 2021, which is hereby incorporated by reference.

SUMMARY

This Summary introduces a selection of concepts in simplified form that are described further below in the Detailed Description. This Summary neither identifies key or essential features, nor limits the scope of the claimed subject matter.

Server-side insertion of digital content can be performed on a live streaming network.

In one aspect, a server-side system and method for real-time digital content insertion can retrieve and insert digital content that is customized for each viewer or for a set of viewers. The customization can be based on criteria like viewer's location, personal data, or other data, or any combination of these. Other criteria can be included in content insertion metadata.

In one aspect, a system and method detects content insertion metadata in a stream to identify locations in the stream for digital content insertion.

In one aspect, a system and method detects static areas in a video stream suitable for digital content insertion.

In one aspect, a server-side system and method allows for quick and seamless establishment of second screen experiences using invisible data embedded in the video streams providing the ability to access different digital content for each viewer.

In one aspect, a system supports live streaming of content to a plurality of subscriber devices with server-side real-time digital content insertion. The system may include one or more hardware processors configured by machine-readable instructions. The machine-readable instructions may be configured to, for each viewer among a plurality of viewers, detect, in a stream of content streamed to a subscriber device associated with the viewer, a location in the stream where to insert digital content for the viewer. The machine-readable instructions may be configured to retrieve respective digital content for the viewer based on a respective criterium related to the viewer. The machine-readable instructions may be configured to insert the retrieved respective digital content at the detected location in the stream of content to be streamed to the subscriber device associated with the viewer.

In one aspect, a system supports live streaming of content to a plurality of subscriber devices with server-side real-time digital content insertion. The system may include one or more hardware processors configured by machine-readable instructions. The machine-readable instructions may be configured to, for each viewer among a plurality of viewers, determine, in a stream of content streamed to a subscriber device associated with the viewer, a location in the stream where to insert digital content for the viewer. The machine-readable instructions may be configured to retrieve respective digital content for the viewer based on a respective criterium related to the viewer. The machine-readable instructions may be configured to insert the retrieved respective digital content as invisible data in the stream of content to be streamed to the subscriber device associated with the viewer, such that the inserted digital content comprises data that can be extracted at the subscriber device and used by the subscriber device to retrieve digital content targeted to the viewer, wherein different digital content is inserted for each viewer.

In one aspect, a system supports live streaming of content to a plurality of subscriber devices with server-side real-time digital content insertion. The system may include one or more hardware processors configured by machine-readable instructions. The machine-readable instructions may be configured to, for each viewer among a plurality of viewers, detect, in a stream of content streamed to a subscriber device associated with the viewer, static areas in the stream suitable to insert digital content for the viewer. The machine-readable instructions may be configured to retrieve respective digital content for the viewer based on a respective criterium related to the viewer. The machine-readable instructions may be configured to insert the retrieved respective digital content at the detected static area in the stream of content to be streamed to the subscriber device associated with the viewer.

In one aspect, a method, for use in a cluster of devices supporting live streaming of content to a plurality of subscriber devices, supports server-side real-time digital content insertion. For each viewer among a plurality of viewers, in a stream of content streamed to a subscriber device associated with the viewer, a location is detected in the stream where to insert digital content for the viewer. Respective digital content for the viewer is retrieved based on a respective criterium related to the viewer. The retrieved respective digital content is inserted at the detected location in the stream of content to be streamed to the subscriber device associated with the viewer.

In one aspect, a method, for use in a cluster of devices supporting live streaming of content to a plurality of subscriber devices, supports server-side real-time digital content insertion. For each viewer among a plurality of viewers, in a stream of content streamed to a subscriber device associated with the viewer, a location is determined in the stream where to insert digital content for the viewer. Respective digital content for the viewer is retrieved based on a respective criterium related to the viewer. The retrieved respective digital content is inserted as invisible data in the stream of content to be streamed to the subscriber device associated with the viewer, such that the inserted digital content comprises data that can be extracted at the subscriber device and used by the subscriber device to retrieve digital content targeted to the viewer, wherein different digital content is inserted for each viewer.

In one aspect, a method, for use in a cluster of devices supporting live streaming of content to a plurality of subscriber devices, supports server-side real-time digital content insertion. For each viewer among a plurality of viewers, in a stream of content streamed to a subscriber device associated with the viewer, static areas are detected in the stream suitable to insert digital content for the viewer. Respective digital content for the viewer is retrieved based on a respective criterium related to the viewer. The retrieved respective digital content is inserted at the detected static area in the stream of content to be streamed to the subscriber device associated with the viewer.

In any of the foregoing, the respective criterium for the viewer can include any one or more of: the viewer's respective location, viewer's respective personal data, information provided in content insertion metadata in the stream, or combinations thereof.

In any of the foregoing, detecting the location in the stream can include any one or more of the following. Detecting the location can include processing content insertion metadata in the stream. Such content insertion metadata can include SCTE-35 data. Detecting the location in the stream can include processing image data in the stream to identify areas in the image data that can be repurposed for inserting digital content. For example, areas in the image data that can be repurposed for inserting digital content can include static areas detected in the stream.

In any of the foregoing, the detecting, retrieving, and inserting for each viewer can be performed by a respective device in the cluster of devices which participates in streaming the stream of content with the inserted respective digital content to the subscriber device associated with the viewer. The device can be an edge device assigned to stream data to a subscriber device associated with the viewer.

In any of the foregoing, retrieving can include requesting the respective digital content for the viewer from a content server, based on the respective criterium for the viewer; and receiving the respective digital content for the viewer from the content server.

In any of the foregoing, a server can access backup content for the viewer for the stream and insert the backup content as the respective digital content for the viewer. Inserting the backup content can be performed in response to a time-out of a request to the content server.

In any of the foregoing, a server can access alternate content for streaming to a plurality of viewers of a stream and switch streaming from streaming the stream to the plurality of viewers, to streaming the alternate content to the plurality of viewers, and back to streaming the stream to the plurality of viewers.

In any of the foregoing, a forensic watermark can be added to the stream delivered to a viewer. Insertion of the respective digital content into a stream can be done by adding a forensic watermark based on the respective digital content to the stream. Adding the forensic watermark based on the respective digital content can includes including data as part of the forensic watermark that can be extracted at a subscriber device and used by the subscriber device to retrieve targeted digital content. The forensic watermark can be unique for each viewer.

In any of the foregoing, the inserted digital content can include data that can be extracted at a subscriber device and that can be used by the subscriber device to retrieve targeted digital content.

The following Detailed Description references the accompanying drawings which form a part this application, and which show, by way of illustration, specific example implementations. Other implementations may be made without departing from the scope of the disclosure.

DETAILED DESCRIPTION

Server-side insertion of digital content can be performed on a live streaming network. A video streaming server for digital content insertion can be deployed in a cluster architecture that supports a large number of clients while providing a live video streaming experience with an end-to-end latency below 500 milliseconds (ms). The cluster architecture, in some embodiments, can be implemented on a cloud-based infrastructure (such as a set of servers provided by a service such as Amazon Web Services (AWS) or Microsoft Azure) using a set of compute instances that include stream managers devices, origin devices, relay devices, and edge devices that are deployed on the cloud infrastructure. The cluster architecture can be implemented using technologies other than a cloud-based cluster. A content delivery network (CDN), a decentralized network such as described herein, or other collection of server computers accessible over a computer network can be used. In the example of a cloud infrastructure, for example, such a deployment can be controlled by the content providers or can be provided as a service to content providers. In some implementations, the cluster architecture includes a set of clusters that are deployed in different geographic regions to serve traffic coming from anywhere while providing low latency delivery of the video streams. Example implementations of such a cluster architecture are described in U.S. Pat. Nos. 8,019,878, 8,024,469, 8,171,145, 8,166,181, and 8,019,867, and U.S. Published Patent Applications 2019/0320004, 2019/0320014, and 2019/0028465, all of which are hereby incorporated by reference.

The video streaming server can be implemented with any streaming device in the cluster, such as an origin device, relay device, or edge device, or any combination of these. The video streaming server can integrate with digital content insertion services to allow broadcasters to insert on the server-side and in real-time any digital content, whether images, video, audio, or other content, or any combination of these, into live media streams. The inserted digital content can be created ad-hoc for each viewer or for a selected set of viewers, or any combination of these.

An industry standard for advertisement insertion is based on SCTE-35 signals. Such signals can be included in any video content as in-band data. For example, such SCTE-35 signals can be included as in-band data when using real-time messaging protocol (RTMP). For example, such SCTE-35 signals can be included as part of the manifest when using the HTTP live streaming (HLS) protocol.

Figure 1:
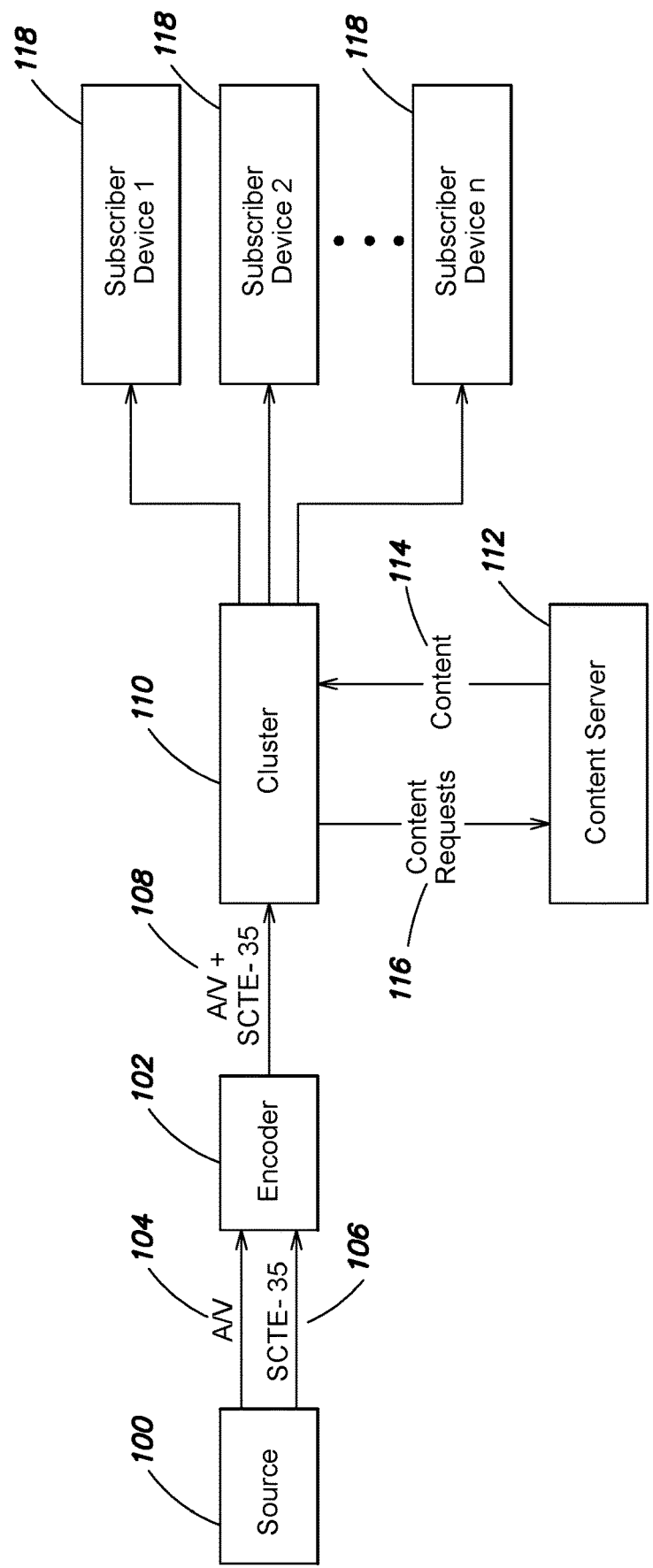
FIG. 1 is an architecture diagram of an example implementation of server-side digital content insertion, showing how a video server can receive a live stream with SCTE-35 metadata and interface with a content server to receive digital content to insert into the live stream.

FIG. 1 is an architecture diagram illustrating an example implementation of how a video streaming server in a cluster architecture can receive a live stream with SCTE-35 metadata and interface with a content server of a content service company to receive digital content to insert into a live stream.

For each live stream, a source 100 provides streaming media data, such as audio and video data (A/V) 104, and content insertion metadata, such as SCTE-35 metadata 106, to an encoder 102. The encoder processes the received data and embeds content insertion metadata into the live stream 108, which in turn is published to a live streaming cluster 110. One or more devices (also called "nodes"), such as origin devices, relay devices, or edge devices, in the live streaming cluster use the SCTE-35 data to interface with the content server 112 to retrieve the digital content to be inserted into the live feed of each viewer, which in turn is delivered to respective downstream subscriber devices 118. When the video streaming server is implemented on edge devices, then each edge device can insert and deliver different content to its respective subscriber devices than other edge devices deliver to their respective subscriber devices.

A video streaming server in the cluster 100 can generate requests 116 for content. The requests can be based on the criteria related to a viewer, criteria related to the content, or other criteria, or any combination of these. Examples of criteria related to the viewer include but are not limited to a viewer's location or a viewer's personal data. The viewer is one for which the video streaming server has access to such information and for which the subscriber device is downstream from the video streaming server. Examples of criteria related to the content include but are not limited to content insertion metadata, such as SCTE-35 data. Examples of criteria of other data include data extracted from the content such as static areas or watermarks. In response, the content server provides the corresponding content 114.

Architecture Specification

The following sections describe in greater detail how a live streaming cluster can support dynamic insertion of digital content into the live streams and some example use cases that may benefit from such dynamic content insertion.

Ad Insertion and SCTE-35

SCTE-35 is a joint ANSI/Society of Cable and Telecommunications Engineers core signaling standard for advertising and distribution control of content for content providers and content distributors. SCTE-35 signals can be used to identify advertising breaks, advertising content, and programming content, i.e., specific programs, or chapters within a program, or both.

The SCTE-35 signals are included by an encoder in the video content as in-band data, for example when using RTMP, or as part of the manifest when using HLS. The signals specify advertisement placement opportunities by indicating the presentation time where digital content can be inserted and for what duration along with other information.

Servers in the live streaming cluster (e.g., 110 in FIG. 1) can use SCTE-35 data together with a content server (e.g., 112 in FIG. 1) to retrieve content and ingest them into the live streams on the edge servers, which are instances of nodes in the live streaming cluster which deliver streams to subscriber devices used by subscribers to watch a live stream.

Considering that the live streaming cluster delivers video in near real-time, and that it is not possible to predict the amount of time it will take to retrieve content 112 from a third-party service, some implementations can provide solutions to ensure content is available.

In some implementations, the edge server keeps configurable back-up content, such as a video ad or slate, to be played in the case that the content server 112 does not return the desired content 114 in time.

In some implementations, the SCTE-35 data is provided off-band. Using that approach, a server in the live streaming cluster processes the SCTE-35 data before receiving the video to which the SCTE-35 data refers (typically by reference to timestamps). In this way, the digital content are pre-fetched ahead of time by the server, and thus guaranteeing higher chances of displaying the expected digital content to each client.

Figure 2:
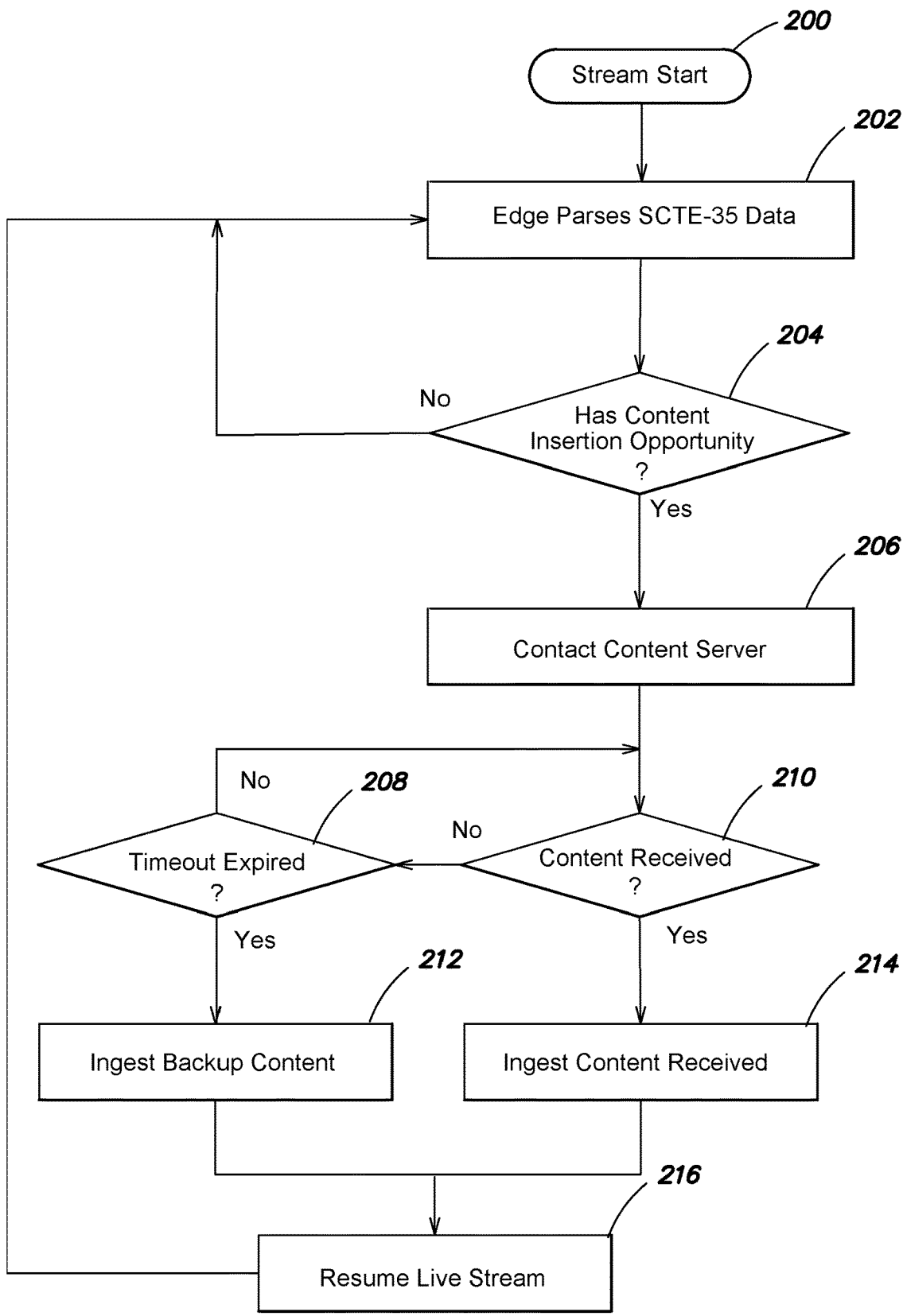
FIG. 2 is a flow diagram of an example implementation of a process for fetching and inserting digital content.

A flow diagram of an example implementation of the fetching and insertion process is shown in FIG. 2.

As indicated at 200, a stream starts. The stream begins transmission from the source into the streaming cluster, ultimately delivering the stream to an edge server associated with a subscriber. The edge server parses (202) the SCTE-35 data in the stream. If the SCTE-35 does not indicate any content insertion opportunity, as determined at 204, the edge server continues to deliver the stream as received, and parses (202) subsequently received SCTE-35 data.

If the SCTE-35 data does indicate a content opportunity, then the content server is contacted (206). If the content is received by the edge server from the content server, as determined at 210, then the received content is ingested into the stream delivered by the edge device to the subscriber device. Transmission of the live stream is then resumed (216). If the content is not received by edge server from the content server, and a time out occurs, as indicated at 208, then backup content can be ingested (212), and transmission of the live stream is then resumed (216).

Running such a process on the edge servers allows the live streaming cluster to insert the appropriate content based on the region where the edge server is deployed or based on individually targeting the viewer based on information about the viewer or the subscriber device. When the edge servers are deployed in a clustered architecture, groups of edge servers are deployed in different regions. In this way, each video stream viewer can connect to a geographically proximate edge server to have the best performance. Therefore, video server instances deployed in a certain region, for example the eastern region of the United States, are likely to mostly serve users located around that geographic region. Therefore, the edge servers in each region can retrieve and insert into the live stream content that is targeted for that region, which may be different from content targeting other regions.

The live streaming cluster can support also can support such functionality with a stream switching API that supports the insertion of pre-encoded flash video (FLV) video into live streams. In this way, when a stream switching call is made, the FLV video is inserted, and all subscribers of that stream seamlessly watch the content of the FLV video until the original content is resumed using another stream switching call. It should be noted that if the content server cannot provide the desired content in FLV format, then additional processing or transcoding may be involved.

A stream switching API allows an edge server to switch the content of a live stream for all subscribers at once, but it does not allow inserting different content for different viewers watching the same stream. To support that use case, in some implementations, a video server can include a video-on-demand (VOD) "Puller," which is herein the name for a custom server-side component that loads on demand a video from a remote service and injects it into the live stream provided to a viewer. In this way, the server-side application intercepts subscribe requests, parses the SCTE-35 data, and for each of them retrieves the respective content to display to the corresponding user. When the content is retrieved, the VOD Puller injects it into the side stream associated with the viewer and resumes the original content once the content ends.

Figure 3:
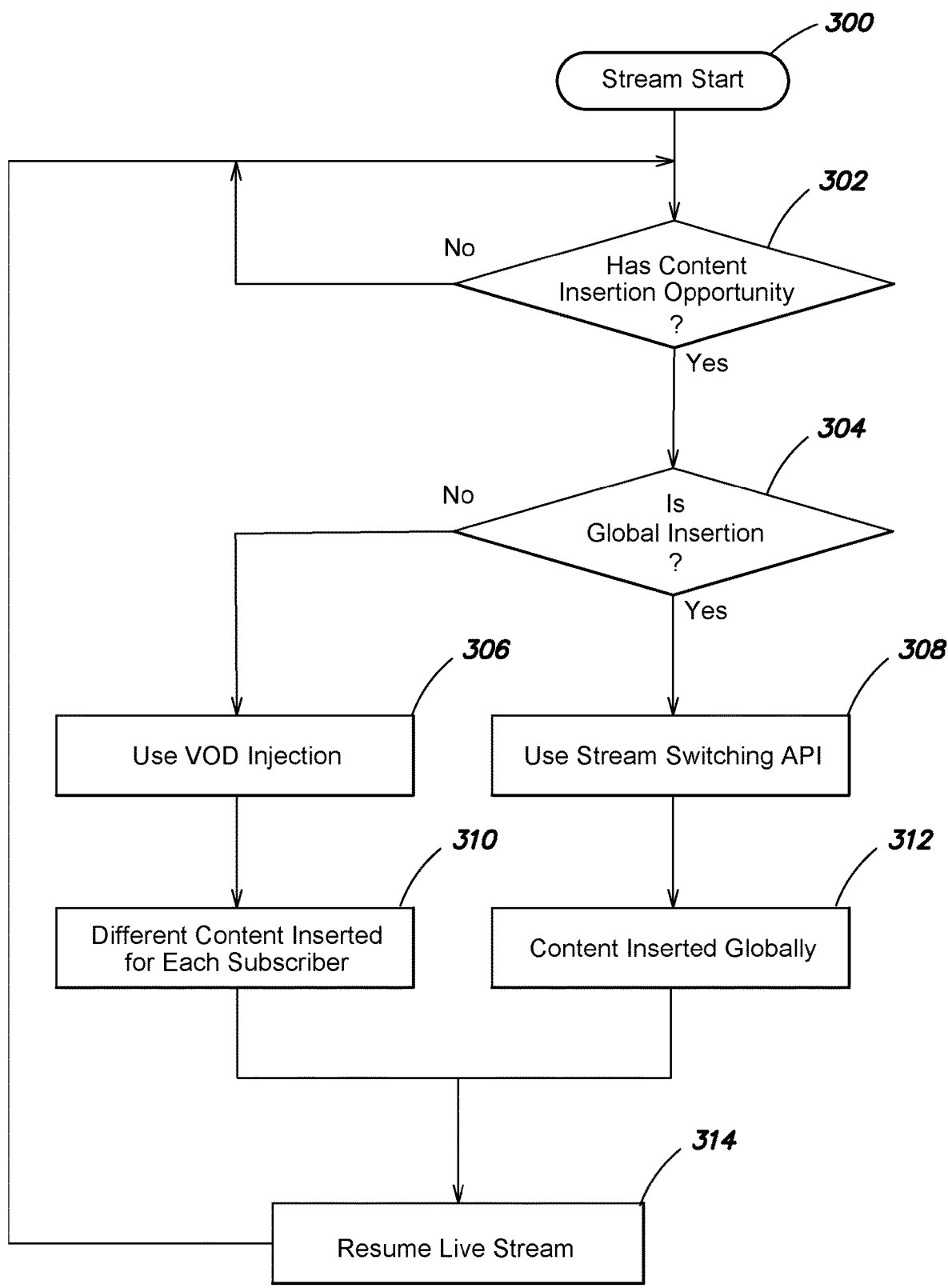
FIG. 3 is a flow diagram of another example implementation of a process for fetching and inserting digital content.

FIG. 3 shows a flow diagram of an example implementations the two types of content insertions discussed above.

In FIG. 3, as indicated at 300, a stream starts. If the stream includes a content insertion opportunity, as determined at 302, the edge server determines (302) whether a global insertion or a local insertion is to be performed. If a global insertion is to be performed, then a stream switching API is used (as indicated at 308), and content is inserted globally (312), i.e., over several delivered streams. If the local insertion is to be performed, then a form of "video-on-demand" or VOD injection is performed (306), e.g., using the VOD Puller described above, and different content is inserted for different subscribers (310). Transmission of the live stream is then resumed (314).

A requirement of the SCTE-35 standard is for the video stream to include an IDR frame (a special type of I-frame in H.264 which specifies that no frame after the IDR frame can reference any frame before it, or its equivalent in another encoding format.) at the points for inserting content to guarantee a clean cut between the live stream and the inserted content. During playback, the IDR frame makes the decoder clear its reference picture buffer so that it no longer uses data included in the previous frames when decoding subsequent frames. The live streaming cluster and its various components for implementing content insertion ensure that the IDR frame is inserted into the live content at the content insertion points. Additionally, the video server can ensure that an I-frame or key frame is present when the live stream resumes the original content. If that was not the case, the player during playback would not show a smooth transition between the end of the inserted content and the live video content when resuming. To achieve this, the stream ingested at an origin server already has the IDR and key frames on the boundaries of the content insertion opportunities. This behavior can be overridden with state variables such as 'force=true' that when coupled with a WebRTC mechanism to ensure key frame on join resumed the main program faster. However, results can vary by content and interval of key.

Forensic Watermarking

Forensic watermarking is a process where identifying information of a user is hidden in the video provided to the user, typically so that it is imperceptible, impossible or difficult to remove without damaging the video, and secure. The data included as part of the forensic watermarking can also be used for content insertion. In particular, the watermarking data can be quickly extracted from the live stream on the client side and used to retrieve targeted digital content to present along the video stream. As an example, such digital content can include links to content relevant to the video content, which can be available on any server or the content server in FIG. 1.

One forensic watermarking approach is AB Watermarking. It uses a watermarking library for creating two copies of the same video, A and B, where each copy includes a different watermark, and having each user receive the A and B video packets according to different and unique permutations. In this way, if the video is processed the A and B sequence can be extracted to determine the specific user that is receiving the video stream. An example of forensic watermarking is described in U.S. Provisional Patent application Ser. No. 63/129,711, filed Dec. 23, 2020, and U.S. patent application Ser. No. 17/550,472, filed Dec. 14, 2021, both of which are hereby incorporated by reference, and in FIG. 4.

Figure 4:
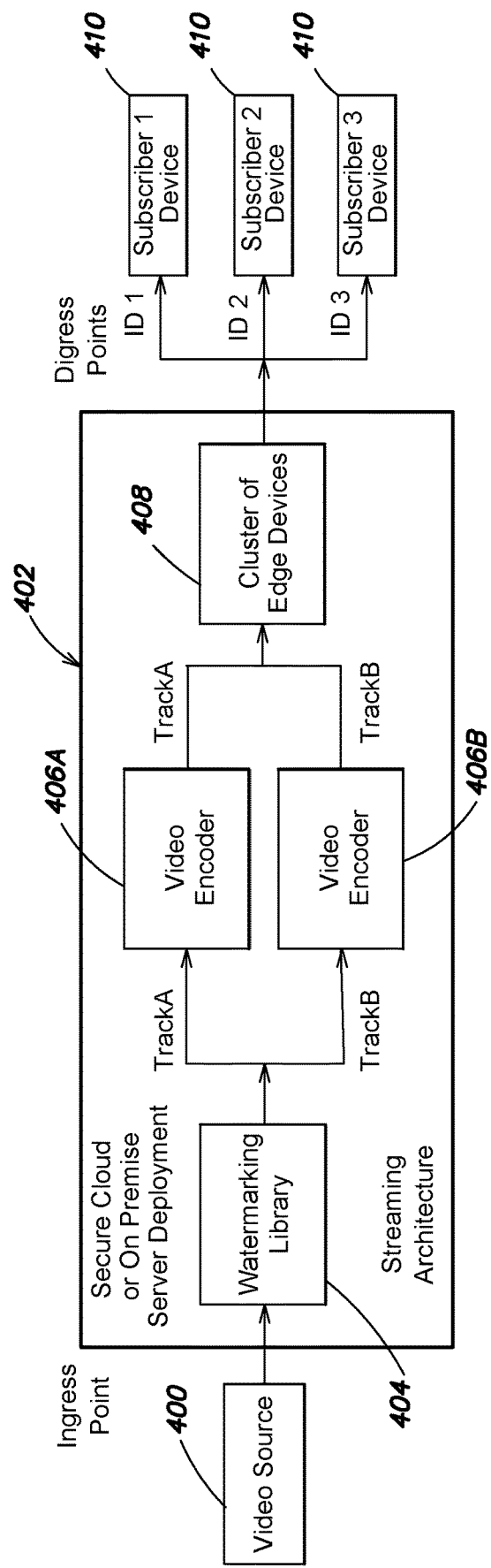
FIG. 4 is a diagram of an example implementation of a live video streaming architecture with real-time watermarking with a subscriber mark enabled.

Referring to FIG. 4, an example implementation of a live media streaming architecture with real-time watermarking with a subscriber mark enabled will now be described. A video source 400 provides uncompressed or compressed video to the streaming architecture 402, e.g., via software, hardware, or network interface. Ingress of the original digital media may come from any of a variety of sources, such as video on demand (VOD) sources, serial, or parallel digital delivery interfaces, or through live delivery over protocols like WebRTC, secure reliable transport (SRT), real-time streaming protocol (RTSP), real-time messaging protocol (RTMP), MPEG transport stream (MPEG-TS), or any other network delivery.

For each video frame that arrives into the streaming architecture 402, a watermarking library 404 provides, in one implementation, A and B versions of the input frame to the inputs of video encoders 406A and 406B (collectively, "406"). After processing the video frames, the video encoders 406 send the output to a cluster of edge devices 408 which processes user requests for video and delivers differently marked streams to different subscriber devices 410. Different respective combinations of the "A/B" versions are generated by each edge device in the cluster 408 and are provided to the subscriber devices based on the different subscriber identifiers.

Egress of the watermarked content may go through any channel of an over-the-top (OTT) media delivery platform, while currently the lowest latency with widest support is achievable through WebRTC. An OTT platform is a service that enables delivery of live digital media streams, such as video, to any internet-enabled device.

In some implementations, the video encoder 406 may be present in two or more instances, as shown in FIG. 4 at 406A and 406B, in which each video encoder provides a differently watermarked stream as output. In some implementations, the video encoder 406 may be present in one instance that is modified in a way that it outputs two or more differently watermarked streams.

The edge devices 408 allow for fast and location-independent optimal access to the video streams sent to the subscribers. In FIG. 4, each edge device implements an algorithm which takes subscriber information for a subscriber and license conditions as input and provides a binary sequence (ABAA . . . BBAB) as output. This respective binary sequence for each subscriber is used to generate the video stream transmitted to that subscriber.

Such watermarking allows broadcasters to protect their content by being able to determine who leaked the content, if a leak occurs. Additionally, the live streaming cluster can include software libraries that implement tools to extract the forensic watermark in 5 to 15 seconds, which represents a major improvement when compared to HLS based forensic watermarking solutions where the extraction process requires between 5 to 15 minutes. This time may be shortened by using smaller codes. The live streaming cluster can add watermarks at the frame or subframe levels whereas HLS solutions are limited to one watermark per segment where each segment may be as long as 6 seconds. Therefore, while an HLS based solution can change the watermark every 6 seconds, the live streaming cluster using this solution can change it every 33.33 milliseconds when using a different watermark per frame and a frame rate of 30 fps.

The software libraries for watermark extraction can be used to create second screen experiences where viewers point their smartphone at the live stream they are watching and are redirected to a platform where they can better interact with the live stream. Forensic watermarks also can be used to identify users on the client side and report back the inserted content they have actually watched, and thus facilitating the creation of accurate reports.

Flat Plains Detection

The ability of the live streaming cluster to process in real time the video frames of a live stream using additional components can be exploited to detect flat plains in the video streams that can be used for insertion of alternate digital content. In some implementations, his component is a real-time stream processor written in native code that enables fast encoding/decoding of video and audio streams. The component can be implemented to supports Brews, which allow developers to write custom C++ code, to write code that intercepts the frames and their raw video pixels after the decode process to manipulate them before they are reencoded and pushed through to be streamed.

A flat plain is defined as an area of a live stream that does not include content of interest and that can be repurposed. For example, for a video stream with a person talking in the frame with a wall in the background, part of the wall can be considered a flat plain and used to display alternate digital content that is relevant to the stream's content. Other kinds of areas or objects within the image data for a stream can be identified and used for content insertion. The video server can detect those areas, using a software component that exploits OpenCV or suitable machine learning algorithms, and insert digital content such as overlays as dictated by the broadcaster.

Figure 5:
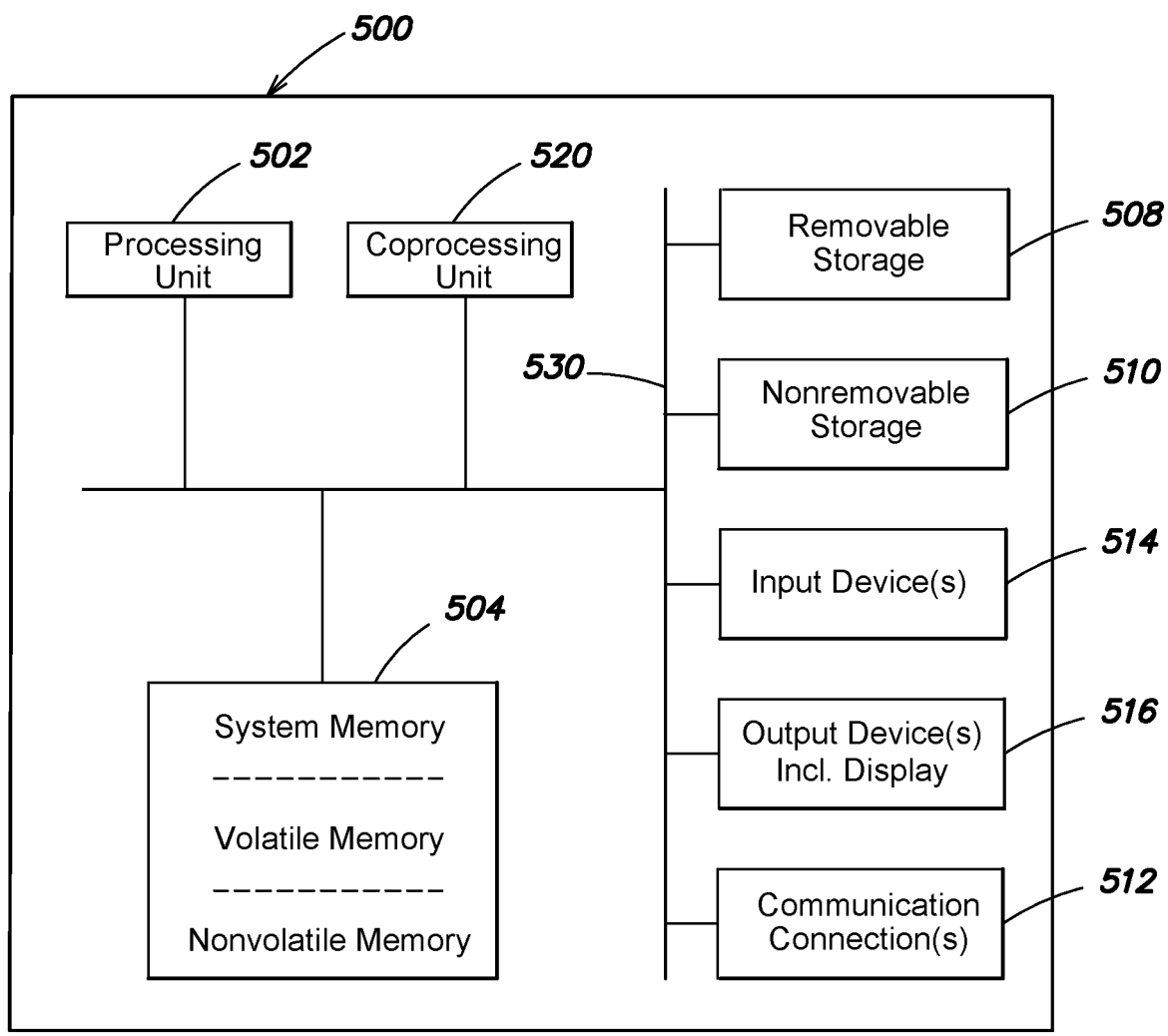
FIG. 5 is a block diagram of an example general-purpose computer.

Having now described several example implementations, FIG. 5 illustrates an example of a general-purpose computing device with which can be used to implement a node, user's device, client device, edge, relay, origin, stream manager, media server, transcoder, application server, content server, or other computer system as described here, used in connection with providing a cluster of computers. This is only one example of a computer and is not intended to suggest any limitation as to the scope of use or functionality of such a computer. The system described above can be implemented in one or more computer programs executed on one or more such computers as shown in FIG. 5.

FIG. 5 is a block diagram of a general-purpose computer which processes computer program code using a processing system. Computer programs on a general-purpose computer typically include an operating system and applications. The operating system is a computer program running on the computer that manages and controls access to various resources of the computer by the applications and by the operating system, including controlling execution and scheduling of computer programs. The various resources typically include memory, storage, communication interfaces, input devices, and output devices. Management of such resources by the operating typically includes processing inputs from those resources.

Examples of such general-purpose computers include, but are not limited to, larger computer systems such as server computers, database computers, desktop computers, laptop, and notebook computers, as well as mobile or handheld computing devices, such as a tablet computer, handheld computer, smart phone, media player, personal data assistant, audio or video recorder, or wearable computing device.

With reference to FIG. 5, an example computer 500 comprises a processing system including at least one processing unit 502 and a memory 504. The computer can have multiple processing units 502 and multiple devices implementing the memory 504. A processing unit 502 can include one or more processing cores (not shown) that operate independently of each other. Additional co-processing units, such as graphics processing unit 520, also can be present in the computer. The memory 504 may include volatile devices (such as dynamic random-access memory (DRAM) or other random access memory device), and non-volatile devices (such as a read-only memory, flash memory, and the like) or some combination of the two, and optionally including any memory available in a processing device. Other memory such as dedicated memory or registers also can reside in a processing unit. This configuration of memory is illustrated in FIG. 5 by dashed line 504. The computer 500 may include additional storage (removable or non-removable) including, but not limited to, magnetically recorded or optically-recorded disks or tape. Such additional storage is illustrated in FIG. 5 by removable storage 508 and non-removable storage 510. The various components in FIG. 5 typically are interconnected by an interconnection mechanism, such as one or more buses 530.

A computer storage medium is any medium in which data can be stored in and retrieved from addressable physical storage locations by the computer. Computer storage media includes volatile and nonvolatile memory devices, and removable and non-removable storage devices. Memory 504, removable storage 508 and non-removable storage 510 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

The computer 500 may also include communications connection(s) 512 that allow the computer to communicate with other devices over a communication medium. Communication media typically transmit computer program code, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media include any non-wired communication media that allows propagation of signals, such as acoustic, electromagnetic, electrical, optical, infrared, radio frequency and other signals. Communications connections 512 are devices, such as a network interface or radio transmitter, that interface with the communication media to transmit data over and receive data from signals propagated through communication media.

The communications connections can include one or more radio transmitters for telephonic communications over cellular telephone networks, or a wireless communication interface for wireless connection to a computer network. For example, a cellular connection, a Wi-Fi connection, a Bluetooth connection, and other connections may be present in the computer. Such connections support communication with other devices, such as to support voice or data communications.

The computer 500 may have various input device(s) 514 such as various pointer (whether single pointer or multi-pointer) devices, such as a mouse, tablet and pen, touchpad and other touch-based input devices, stylus, image input devices, such as still and motion cameras, audio input devices, such as a microphone. The computer may have various output device(s) 516 such as a display, speakers, printers, and so on, also may be included. These devices are well known in the art and need not be discussed at length here.

The various storage 510, communication connections 512, output devices 516 and input devices 514 can be integrated within a housing of the computer or can be connected through various input/output interface devices on the computer, in which case the reference numbers 510, 512, 514 and 516 can indicate either the interface for connection to a device or the device itself.

An operating system of the computer typically includes computer programs, commonly called drivers, which manage access to the various storage 510, communication connections 512, output devices 516 and input devices 514. Such access can include managing inputs from and outputs to these devices. In the case of communication connections, the operating system also may include one or more computer programs for implementing communication protocols used to communicate information between computers and devices through the communication connections 512.

Each component (which also may be called a "module" or "engine" or the like), of a computer system and which operates on one or more computers, can be implemented as computer program code processed by the processing system (s) of one or more computers. Computer program code includes computer-executable instructions or computer-interpreted instructions, such as program modules, which instructions are processed by a processing system of a computer. Such instructions define routines, programs, objects, components, data structures, and so on, that, when processed by a processing system, instruct the processing system to perform operations on data or configure the processor or computer to implement various components or data structures in computer storage. A data structure is defined in a computer program and specifies how data is organized in computer storage, such as in a memory device or a storage device, so that the data can accessed, manipulated, and stored by a processing system of a computer.

It should be understood that the subject matter defined in the appended claims is not necessarily limited to the specific implementations described above. The specific implementations described above are disclosed as examples only.

What is claimed is:

1. A method, for use in a cluster of devices supporting live streaming of live data streams comprising digital content to a plurality of subscriber devices for a respective plurality of viewers, the cluster of devices including an origin device configured to receive a live data stream and stream the live data stream to a plurality of server devices, each server device configured to receive live data streams and further distribute the received live data streams to a respective subset of the plurality of subscriber devices assigned to the server device, the cluster of devices further comprising a content server include additional content for viewers, the method comprising:

for each viewer among the plurality of viewers,
the server device assigned to the respective subscriber device for the viewer detecting, in a live data stream comprising digital content streamed to the respective subscriber device for the viewer, data describing a location in the live data stream where to insert respective additional digital content selected for the viewer;

the server device assigned to the respective subscriber device for the viewer retrieving, from the content server, the respective additional digital content for the viewer based on a respective criterium related to the viewer; and the server device assigned to the respective subscriber device for the viewer inserting the retrieved respective additional digital content at the location, described by the detected data, in the live data stream; and the server device assigned to the respective subscriber device for the viewer further streaming the live data stream with the respective additional digital content to the respective subscriber device for the viewer.

2. The method of claim 1, wherein the respective criterium related to the viewer comprises the viewer's respective location.

3. The method of claim 1, wherein the respective criterium related to the viewer comprises the viewer's respective personal data.

4. The method of claim 1, wherein the respective criterium related to the viewer comprises information provided in content insertion metadata in the stream.

5. The method of claim 1, wherein detecting the data describing the location in the live data stream comprises processing content insertion metadata in the live data stream.

6. The method of claim 1, wherein the retrieving comprises:

the server device sending a request to the content server for the respective additional digital content for the viewer using the respective criterium related to the viewer; and receiving the respective digital content for the viewer from the content server.

7. The method of claim 6, further comprising:
accessing backup content for the viewer for the live data stream; and
inserting the backup content as the respective additional digital content for the viewer.

8. The method of claim 7, wherein the inserting the backup content is performed in response to a time-out of the request to the content server.

9. The method of claim 6, further comprising:
accessing alternate content for streaming to a plurality of viewers of the live data stream; and
switching streaming from streaming the live data stream to the plurality of viewers, to streaming the alternate content to the plurality of viewers, and switching back to streaming the live data stream to the plurality of viewers.

10. The method of claim 1, further comprising processing image data in the live data stream to identify an area in the image data for inserting digital content.

11. The method of claim 10, wherein the identified area in the image data comprises a static area detected in the image data in the live data stream.

12. The method of claim 1, wherein the inserted respective additional digital content comprises data that can be extracted by the subscriber device for the respective viewer and used by the subscriber device to retrieve targeted digital content.

13. A computer system for supporting live streaming of live data streams comprising digital content to a plurality of subscriber devices for a respective plurality of viewers, comprising:
> a cluster of devices including an origin device configured to receive a live data stream and stream the live data stream to a plurality of server devices, each server device configured to receive live data streams and further distribute the received live data streams to a respective subset of the plurality of subscriber devices assigned to the server device;
> a content server comprising computer storage storing additional content for viewers;
> wherein each server device comprises a processing system and computer program instructions that when processed by the processing system configure the server device to, for each subscriber device among the respective subset of subscriber devices assigned to the server device:
> receive a live data stream comprising digital content to be streamed to the subscriber device for a respective viewer;
> detect, in the received live data stream, data describing a location in the live data stream where to insert respective additional digital content to be selected for the respective viewer;
> retrieve, from the content server, the respective additional digital content for the respective viewer based on a respective criterium related to the respective viewer;
> insert the retrieved respective additional digital content at the location, described by the detected data, in the live data stream; and
> stream the live data stream with the respective additional digital content to the respective subscriber device for the respective viewer.

14. The computer system of claim 13, wherein to retrieve the respective additional digital content, the server device is further configured to:
> request the respective additional digital content for the viewer from the content server using the respective criterium related to the viewer; and
> receive the requested respective additional digital content for the viewer from the content server.

15. The computer system of claim 14, wherein to retrieve the respective additional digital content, the server device is further configured to:
> access backup content for the viewer; and
> insert the backup content as the respective additional digital content for the viewer.

16. The computer system of claim 15, wherein the server device is further configured to access and insert the backup content in response to a time-out of the request to the content server.

17. The computer system of claim 13, wherein the server device is further configured to:
> access alternate content for streaming to a plurality of viewers of the received live data stream; and
> switch from streaming the received live data stream to the plurality of viewers, to streaming the accessed alternate content to the plurality of viewers, and switch back to streaming the received live data stream to the plurality of viewers.

18. The computer system of claim 13, wherein to detect, the server device is further configured to:
> process image data in the live data stream to identify an area in the image data for inserting digital content.

19. The computer system of claim 18, wherein the identified area in the image data comprises a static area detected in the image data in the live data stream.

20. The computer system of claim 13, wherein the inserted respective additional digital content comprises data that can be extracted by the subscriber device for the respective viewer and used by the subscriber device to retrieve targeted digital content.

* * * * *